United States Patent [19]

Church et al.

[11] 3,841,682

[45] Oct. 15, 1974

[54] VEHICLE BUMPER RUB STRIP CONSTRUCTION

[75] Inventors: Herman S. Church, Cuyahoga Falls; James L. Hagener, Canton; Zach M. Scifres, III, Hartville, all of Ohio

[73] Assignee: Teledyne Mid-America Corporation, Hartville, Ohio

[22] Filed: June 20, 1973

[21] Appl. No.: 371,770

[52] U.S. Cl. ............................... 293/71 R, 52/716
[51] Int. Cl. ............................................. B60r 19/08
[58] Field of Search .......... 293/1, 62, 71 R; 52/716, 52/717, 718; 85/37, 80, 82; 292/314, 320, 321

[56] References Cited
UNITED STATES PATENTS

| | | | |
|---|---|---|---|
| 2,951,674 | 9/1960 | Rice................................. | 85/82 X |
| 3,213,494 | 10/1965 | Mayers et al..................... | 85/80 X |
| 3,359,030 | 12/1967 | Newman.......................... | 293/62 X |
| 3,517,473 | 6/1970 | Kistner et al..................... | 293/1 X |
| 3,572,799 | 3/1971 | Truesdell et al................. | 293/1 |

Primary Examiner—M. Henson Wood, Jr.
Assistant Examiner—John J. Love
Attorney, Agent, or Firm—Frease & Bishop

[57] ABSTRACT

A molded rub strip assembly for mounting on a vehicle bumper to absorb very minor impact forces. An elongated molded pad of rubber is formed with a pair of edge flanges which project outwardly from the rear surface of the pad. A plurality of stud assemblies project outwardly from the rear pad surface beyond the edge flanges for inserting through bumper mounting holes. Each stud assembly has a rigid member which is partially embedded in the pad and a resilient rubber portion formed integrally with the pad. Either the rigid member or resilient portion of the stud assembly has a shoulder formation which passes through the bumper hole upon deformation of the resilient portion, and clamps the bumper between the shoulder formation and edge flanges. The rigid member is a metal nail-like stud which is surrounded by the resilient portion, or alternatively it is a generally triangular-shaped metal clip formed by spaced legs with the resilient portion located between the clip legs.

5 Claims, 20 Drawing Figures

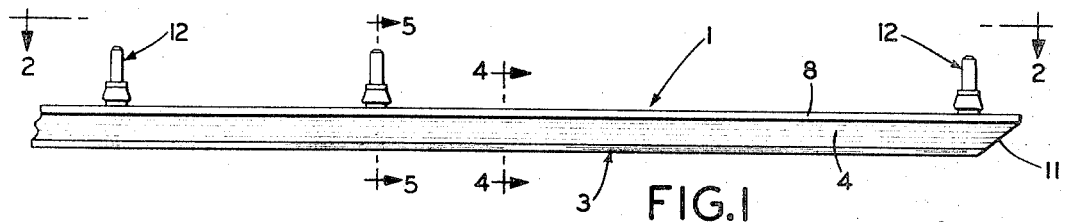
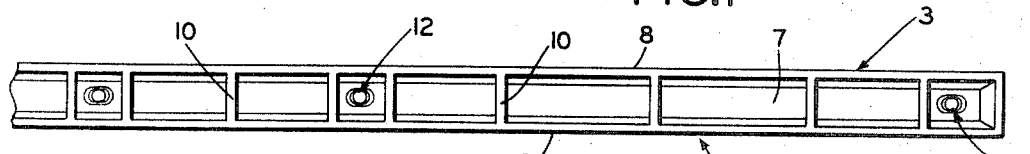
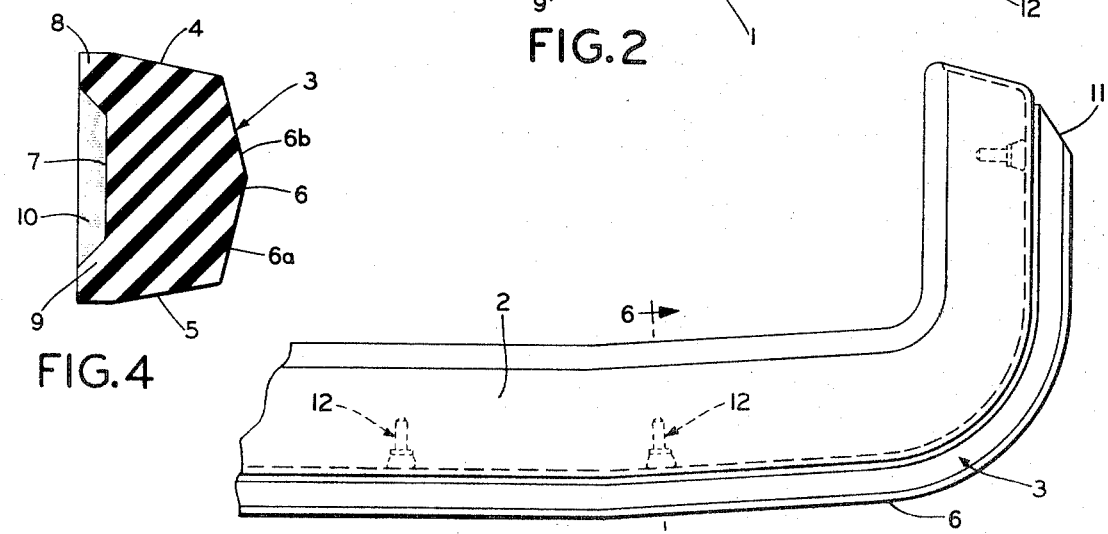
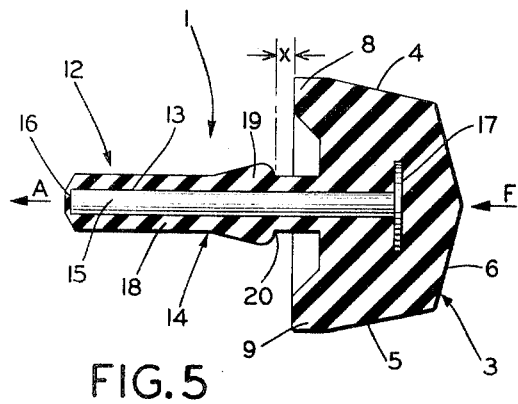
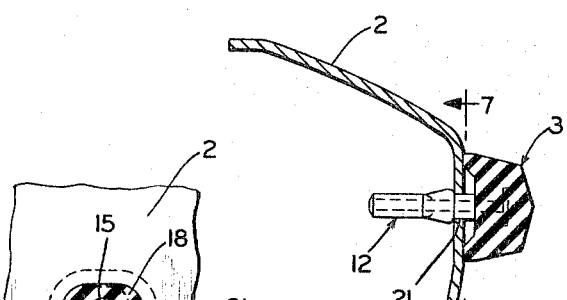
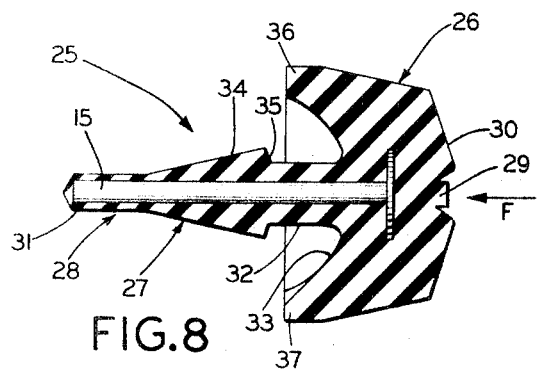

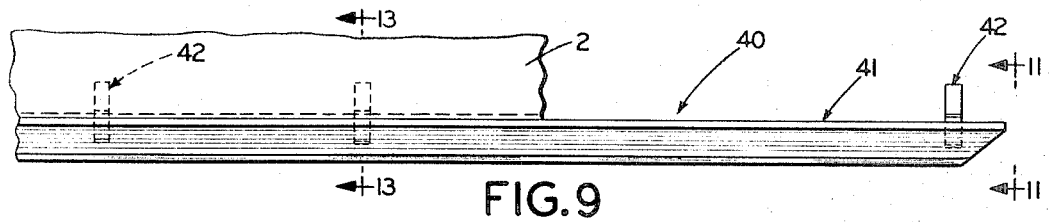
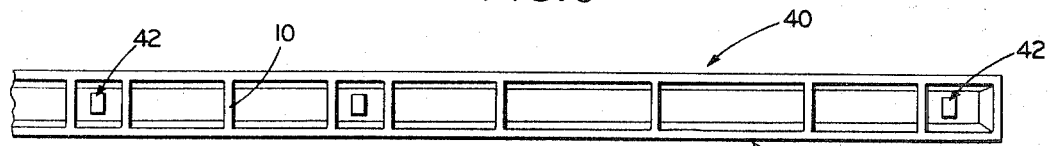
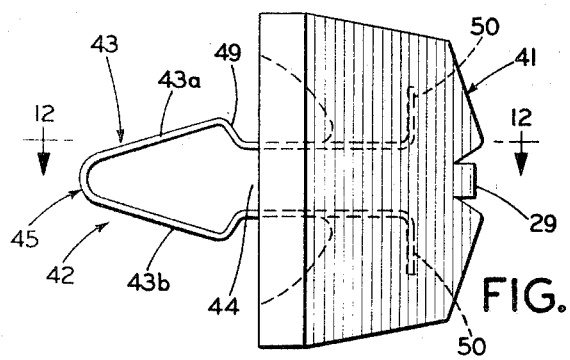
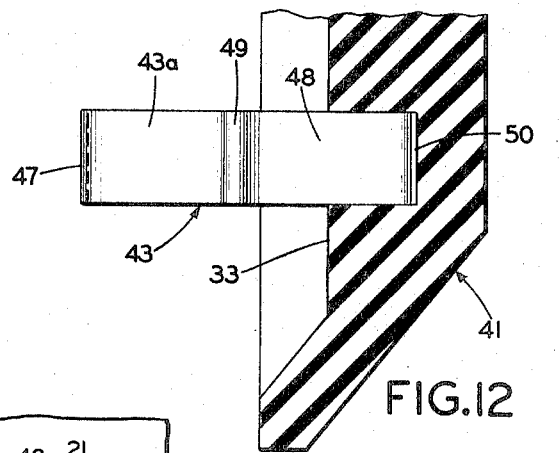
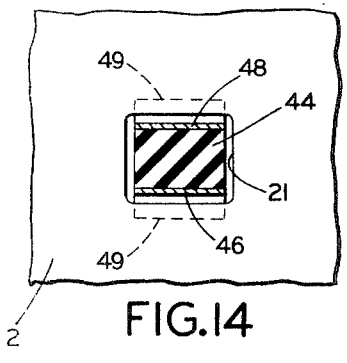
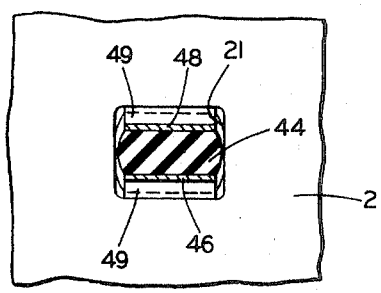
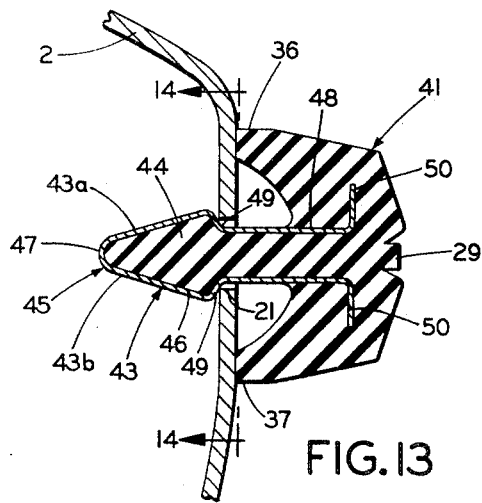
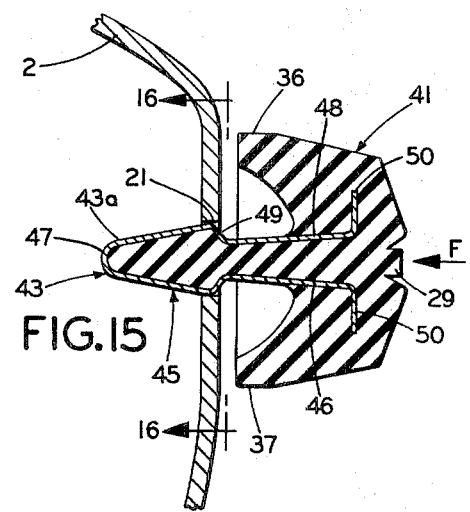

PATENTED OCT 15 1974　　　　　　　　　　3,841,682

PRIOR ART

VEHICLE BUMPER RUB STRIP CONSTRUCTION

BACKGROUND OF THE INVENTION

1. Field of the Invention

The invention relates to vehicle bumpers and in particular to a rub strip construction mounted on a vehicle bumper. More particularly the invention relates to improved attachment means molded integrally with the resilient pad of the rub strip for fastening the strip to a vehicle bumper.

2. Description of the Prior Art

Many vehicle manufacturers currently are installing rub strips on the front and rear bumpers of the vehicles. These rub strips usually are formed with a pad of rubber or other synthetic material having some degree of resiliency whereby very minor impact forces occurring with the bumper are absorbed by the pad without damage to the bumper or the contacting object.

The rub strips also add to the styling and appearance of a vehicle and may be of various colors to match the exterior decor of the vehicle.

The rub strips may be applied to the vehicle bumper during assembly of the vehicle on a production line, or may be sold as an accessory to the vehicle and applied at the vehicle dealer's service department.

Existing vehicle bumper rub strip constructions consist of a rigid U-shaped metal channel bent to conform to the contour of the particular vehicle bumper to which it is to be fastened. Bolts are staked at intervals through openings along the channel which align with preformed openings in the bumpers. The channel and stake bolts then are placed in mold equipment in which a rubber pad is molded about the channel and portions of the bolt shaft. The metal reinforced rub strips then are bolted to a bumper by nuts which are located behind the bumper and engaged with the bolt shaft portions which extend through openings in the bumper.

Considerable problems and expense are involved with the manufacture and installation of these known bumper rub strip constructions. The stamping operation which shapes the channel members and stakes the bolts thereto generally is preformed at a site remote from the location at which the rubber pad is molded and bonded with the channel. Likewise, there may be several sources of supply of these channel-bolt assemblies for a single producer of the finished rubber bonded rub strip component.

Very often the large tolerances for such stamping and staking operations prevent the channel-bolt assemblies from fitting the molding equipment which require closer tolerance than do the stamping and staking operations. Furthermore, shipping the channel assemblies to the rubber boding site is expensive due to the irregular and curved shape of the channels, as well as the shipping cost of the finished bumper rub strip to the vehicle assembly site or vehicle dealer.

An adhesive usually is applied to the metal channel prior to molding and bonding the rubber pad and channel together to achieve an efficient bond between the metal and rubber pad components. The adhesive usually is applied by hand because of the irregular channel shape and the projecting stake bolts. Also, during molding of the rubber pad, rubber "flash" is produced which adheres to the threaded bolt shaft and edges of the pad. This flash normally must be removed by hand since the irregular shape of the rub strip is not adapted to be trimmed by usual cutting and trimming machines. This flash is extremely difficult to remove from the bolt threads without damaging the threads.

The assembly of prior rub strips on vehicle bumpers also presents problems. The stake bolts must align perfectly with the bumper mounting holes, and the channel must match the exact contour of the bumper due to the rigidity of the embedded metal channel. The fastener nuts for the stake bolts are applied from the inner side of the bumper. Sufficient space is not readily available on many currently produced vehicles, large enough to accommodate adequate tools to tighten the fastener nuts.

These fastener nuts and bolts also may corrode or rust, making their removal extremely difficult when it is necessary to remove or replace the rub strip.

Thus, a need has existed for a vehicle bumper rub strip construction which eliminates the heretofore required separate metal stamping and bolt staking operations, and the subsequent shipment of stampings to the rubber molding site; in which the rub strip component can be molded and finished in a straight, generally flat condition thereby reducing costs; and which rub strip can be installed and replaced easily on the vehicle bumper.

SUMMARY OF THE INVENTION

Objectives of the invention include providing a vehicle bumper rub strip construction which eliminates the internal metal channel member, and the stamping and bolt staking procedure heretofore necessary to produce the same; providing a vehicle bumper rub strip construction which is formed in generally flat straight sections permitting the use of less expensive molds to produce the molded rub strip pads, than is necessary for prior curved bumper rub strips, which straight sections enable flash to be removed from the molded rub strip pads by automatic cutting machines, eliminating manual handling of the rub strips, and which straight sections reduce packing and shipping costs; providing a vehicle bumper rub strip construction which has metal nail-like studs embedded within the molded rubber pads, which studs have laterally projecting rubber shoulders molded thereon which are deformed and inserted through bumper attachment openings and grip the bumper eliminating the use of separate fastener nuts which must be installed from the rear of the bumper, and in which bonding adhesive can be applied to the metal studs automatically in a tumbler, etc., eliminating hand application of the adhesive; providing a vehicle bumper rub strip construction having deformable rubber-backed metal clips embedded in the rub strip pad, which clips are inserted through the bumper attachment openings for fast and convenient mounting of the rub strip on the bumper; providing a vehicle bumper rub strip construction in which the rubber pad has bumper contacting flange formations which are under compression when installed on a bumper to securely mount the rub strip thereon and to eliminate movement therebetween; and providing a vehicle bumper rub strip construction eliminating difficulties heretofore encountered with prior rub strip constructions, achieving the stated objectives simply, effectively and at a reduced cost, and solving problems and satisfying existing needs.

These objectives and advantages are obtained by the vehicle bumper rub strip construction, the general nature of which may be stated as including an elongated pad of resilient material having front and rear surfaces; stud means formed on the pad and extending laterally outwardly from the rear pad surface; the stud means including a rigid portion embedded partially within the pad of resilient material and projecting laterally outwardly from the rear pad surface, and resilient portion formed integrally with the pad and bonded to the rigid portion; the stud means resilient portion being adapted to be deformed upon insertion of the stud means through an opening in the vehicle bumper; shoulder means formed on one of the rigid or resilient stud means portions adapted to engage a vehicle bumper when the stud means is inserted through the bumper opening; flanges formed integrally with the resilient pad adjacent the side edges thereof and projecting laterally outwardly from the rear pad surface; the stud means rigid portion preferably being a metal nail-like member having a cylindrical outer surface, and the stud means resilient portion being molded about the cylindrical outer surface and bonded thereto; and the shoulder means being formed on the resilient portion of the stud means.

In the alternative, the stud means rigid portion may be a metal spring clip having spaced members, with the shoulder means formed on the spaced clip members; and the stud means resilient portion being molded between and behind the spaced clip members and bonded thereto.

BRIEF DESCRIPTION OF THE DRAWINGS

Preferred embodiments of the invention — illustrative of the best modes in which applicants have contemplated applying the principles — are set forth in the following description and shown in the drawings and are particularly and distinctly pointed out and set forth in the appended claims.

FIG. 1 is a fragmentary top plan view of the improved bumper rub strip construction as molded in straight condition;

FIG. 2 is a fragmentary rear elevation looking in the direction of arrows 2—2, FIG. 1;

FIG. 3 is a fragmentary top plan view of the improved bumper rub strip construction shown in FIGS. 1 and 2 mounted on a vehicle bumper;

FIG. 4 is an enlarged sectional view of the bumper rub strip rubber pad taken on line 4—4, FIG. 1;

FIG. 5 is an enlarged sectional view taken on line 5—5, FIG. 1;

FIG. 6 is an enlarged sectional view taken on line 6—6, FIG. 3;

FIG. 7 is an enlarged fragmentary sectional view taken on line 7—7, FIG. 6;

FIG. 8 is a sectional view similar to FIG. 5 showing a modified form of the bumper rub strip construction;

FIG. 9 is a fragmentary top plan view showing a further modified bumper rub strip construction, part of which is shown mounted on a vehicle bumper;

FIG. 10 is a rear elevation similar to FIG. 2 of the modified bumper rub strip construction shown in FIG. 9;

FIG. 11 is an enlarged end elevation looking in the direction of arrows 11—11, FIG. 9;

FIG. 12 is a fragmentary sectional view taken on line 12—12, FIG. 11;

FIG. 13 is an enlarged fragmentary sectional view taken on line 13—13, FIG. 9;

FIG. 14 is a further enlarged fragmentary sectional view taken on line 14—14, FIG. 13;

FIG. 15 is a sectional view similar to FIG. 13 showing the modified bumper rub strip construction partially mounted on a vehicle bumper;

FIG. 16 is a further enlarged fragmentary sectional view taken on line 16—16, FIG. 15;

Similar numerals refer to similar parts throughout the drawings.

DESCRIPTION OF THE PREFERRED EMBODIMENTS

First Embodiment

Figure 17:
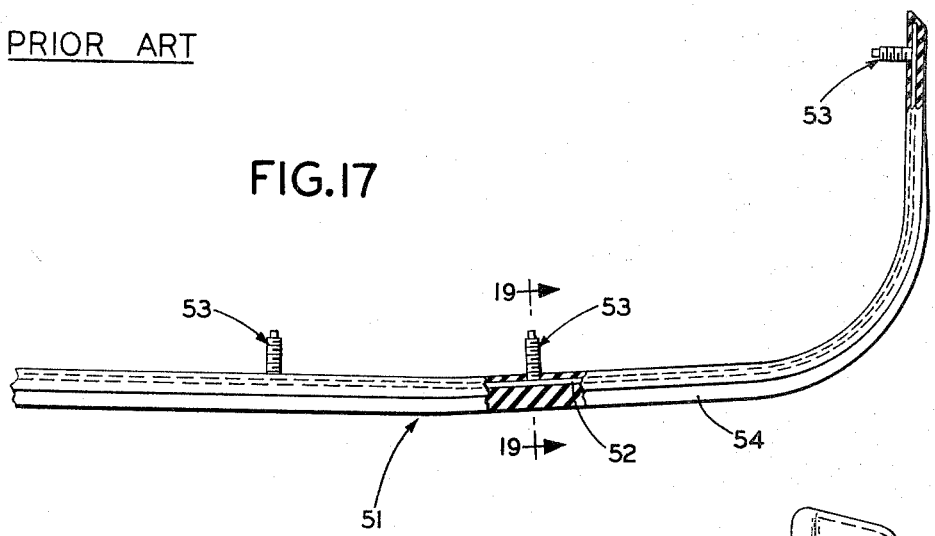
FIG. 17 is a fragmentary top plan view with portions broken away and in section, showing a prior bumper rub strip construction.

The improved bumper rub strip construction is indicated generally at 1 (FIGS. 1 and 2) and is shown mounted on a usual vehicle bumper 2 in FIG. 3. Rub strip 1 includes a generally trapezoidal-shaped pad 3 of molded rubber or other resilient material (FIG. 4).

Pad 3 has diverging tapered side surfaces 4 and 5, and a front surface 6 formed by converging tapered portions 6a and 6b. Rear surface 7 of pad 3 terminates in flanges 8 and 9 which extend longitudinally along the rear edges of pad 3 and are joined integrally with pad side surfaces 4 and 5. A plurality of spaced reinforcing cross ribs 10 (FIG. 2) extend across pad 3 between edge flanges 8 and 9 to provide strength and rigidity to flanges 8 and 9.

The ends 11 of pad 3 are sloped, only one end 11 being shown in FIGS. 1–3, to provide a symmetrical and pleasing appearance for the finished rub strip 1.

In accordance with the invention, a plurality of stud assemblies indicated generally at 12, are formed on pad 3 and project laterally outwardly from rear surface 7. Each stud assembly 12 includes a metal nail-like stud 13, and a resilient molded rubber portion 14, bonded to stud 13 (FIG. 5).

Stud 13 is partially embedded within pad 3 during the molding thereof and projects laterally outwardly from rear surface 7. Stud 13 preferably has a cylindrical shank 15 which terminates in a pointless end 16 and an enlarged head 17 at the opposite end (FIG. 5). Shank 15 projects outwardly from rear pad surface 7 for a distance approximately twice the length of the portion of shank 15 which is embedded along with stud head 17 in pad 3.

Resilient stud portion 14 is molded and bonded to metal stud 13 during the molding of pad 3. The portion 14 preferably has a generally oval configuration in cross-section (FIGS. 5 and 7). The oval shape 18 extends from pointless end 16 of shank 15 to rear surface 7 where it joins integrally with pad 3. An intermediate section 19 of rubber portion 14 has an enlarged tapered oval shape which flares outwardly of the portion 18 toward rear pad surface 7 and terminates in a shoulder 20, and thus interrupts the uniformly extending oval contour 18.

Shoulder 20 is spaced a distance X from the rear edges of pad flanges 8 and 9 (FIG. 5), which distance X is slightly smaller than the thickness of vehicle bumper 2 on which the rub strip 1 is to be mounted (FIG. 6).

The entire end of shank 15 which extends beyond pad 3, including pointless end 16, preferably is covered with rubber having the oval shape 18 to eliminate exposed metal portions of stud 13, which otherwise would be subject to rusting. The thickness of the oval rubber portion 18, and particularly the thickness of the enlarged or flared intermediate oval section 19 must be sufficient for section 19 and its shoulder 20 to be deformed upon assembling rub strip 1 with bumper 2, as described below.

Bumper rub strip 1 is installed easily on bumper 2 by first aligning the projecting stud assemblies 12 with and inserting them partially into preformed holes 21 in bumper 2. The location of holes 21 is predetermined for particular bumpers which corresponds to the location and spacing of stud assemblies 12 on pad 3 at the time of molding strip 1. Incidentally, the fact that only rubber of pad 3 extends between the locations of spaced stud assemblies 12, enables the pad rubber to be deformed sufficiently for studs 12 to accommodate improper spacing of bumper openings 21 during assembly of rub strip 1 with bumper 2.

A blunt object such as a flat end punch then is driven against the front surface 6, at the junction of portions 6a and 6b, as indicated by arrow F (FIG. 5). Flanges 8 and 9 are deformed outwardly permitting rear pad surface 7 to move closer to the bumper front surface. At the same time metal stud 13 and head 17 are forced rearwardly within rubber of pad 3, as well as the resilient stud portion 14, in the direction of arrow A by force F. The movement of rigid stud 13 deforms oval rubber portion 18 and section 19 and shoulder 20 to elongate the same in an axial direction, thereby reducing the size of shoulder 20, permitting shoulder 20 to move through bumper hole 21.

Shoulder 20 expands to resume its normal shape after passing through bumper hole 21, and upon release of force F clamps bumper 2 tightly between shoulder 20 and flanges 8 and 9 of pad 3, as shown in FIG. 6. Oval portions 18 and 19, shoulder 20 and flanges 8 and 9 are under slight compression when pad 3 is installed on bumper 2 to provide a continuous tight clamping action between rub strip 1 and bumper 2.

Although the installation of strip 1 is described above in some detail, in actuality a single blow (force F) on front pad surface 6 may be sufficient to "pop" shoulder 20 through bumper hole 21 to clamping position behind bumper 2.

Bumper hole 21 is oval-shaped having its major and minor diameters generally equal to or slightly less than the corresponding diameters of oval portion 18 of resilient stud portion 14 (FIG. 7) to insure a tight fit therebetween when strip 1 is installed on bumper 2.

Second Embodiment

A modified form of bumper rub strip 1 is indicated generally at 25 and is shown in FIG. 8. Strip 25 is similar to strip 1 except that resilient pad 26 and the resilient portion 27 of stud assemblies 28 have different shapes and configurations than those of pad 3 and stud assemblies 12 of strip 1.

Pad 26 is formed with a raised rib 29 on the front pad surface 30 which extends longitudinally throughout the length of strip 25. Rib 29 extends along strip 25 normal to the axes of metal studs 13 and provides the points of contact for applying force F during installation of strip 25. Rib 29 also may be painted to match the color of the vehicle with the remaining exposed portions of pad 26 being black. This provides a decorative and pleasing appearance for strip 25.

Stud assemblies 27 are molded and formed integrally with pad 26 and surround the extended ends of shanks 15 and are bonded thereto in a manner similar to stud assemblies 12. Resilient stud portion 27 has a small cylindrical end portion 31, a larger cylindrical portion 32 which is integral with rear pad surface 33, and an intermediate cone-like section 34 which terminates in a circular shoulder 35. Cylindrical portions 31 and 32, cone portion 34, and shoulder 35 correspond to oval portion 18, tapered section 19 and shoulder 20 of strip 1, except that cone section 34 is longer in an axial direction, as shown by comparison of FIGS. 5 and 8.

Pad 26 is formed with edge flanges 36 and 37 which extend outwardly from rear pad surface 33 in a manner similar to flanges 8 and 9 of pad 3.

The assembly of strip 25 with bumper 2 is similar to the described procedure of installing strip 1 and need not be repeated. Likewise, the deformation of cylindrical portions 31 and 32, cone section 34, and shoulder 35 of resilient stud 27 to mount strip 25 in bumper 2 is the same as for strip construction 1.

The mounting holes in the vehicle bumper 2 for receiving stud assemblies 28 of strip 25 will be round and have a diameter approximately equal to the diameter of the larger cylindrical portion 32 of stud assemblies 28.

Third Embodiment

A further modified form of the invention is shown in FIGS. 9–16 for a bumper rub strip indicated generally at 40. Strip 40 has a molded rubber pad 41 which is illustrated as being similar to pad 26 of strip 25 with a pad rib 29, although the configuration of pad 3 of strip 1 is equally satisfactory to provide the advantages of the third embodiment.

Strip 40 has a plurality of spaced stud assemblies 42 formed integrally with pad 41 and projecting outwardly from the rear surface thereof. Stud assemblies 42 each have a metal clip 43 partially embedded within pad 41 and projecting laterally outwardly from rear pad surface 33. The resilient portion 44 of stud assembly 42 is located between members 43a and 43b of metal clip 43 (FIG. 13), instead of surrounding a metal shank as do resilient portions 14 and 27 of strips 1 and 25.

Clip 43 is formed of spring steel and has a generally triangularly-shaped free end portion 45 formed by spaced tapered portions 43a and 43b which terminate in a rounded tip 47. Tapered clip portions 43a and 43b are integrally joined to a pair of spaced parallel legs 46 and 48 by shoulders 49. Clip legs 46 and 48 terminate in outwardly turned feet 50 which are embedded within pad 41 and prevent clip 43 from being pulled out of pad 41.

The installation of strip 40 on a bumper 2 is shown in FIGS. 13–16. Tip 47 and tapered clip end portions 43a and 43b are inserted into bumper hole 21 as far as possible. Force F then is applied to rib 29 of pad 41 in a direction which is aligned with the general longitudinal axis of clip 43. Tapered clip portions 43a and 43b and clip legs 46 and 48 are forced toward each other as triangular end 45 of clip 43 moves through bumper hole 21 (FIG. 15) deforming resilient stud portion 44. Resilient stud portion 44 when deformed is compressed and bulges outwardly beyond the edges of tapered clip portions 43a and 43b and clip legs 46 and 48, as shown in FIG. 16.

As the tapered clip portions 43a and 43b pass through hole 21, portions 43a and 43b, legs 46 and 48, and shoulders 49 expand outwardly from the pressure of the compressed rubber 44 between clip portions 43a and 43b and legs 46 and 48. Shoulders 49 then snap into position behind bumper 2 (FIG. 13) engaging the edges of hole 21.

Flanges 36 and 37 preferably are held in slight compression when in the final installed position of FIG. 13 as are the similar flanges of rub strips 1 and 25. Compressed flanges 36 and 37 together with resilient stud portion 44, maintain shoulders 49 of clip 43 engaged with the edges of bumper hole 21, firmly mounting the rub strip 40 on bumper 2.

Clip 43 provides metal-to-metal sliding contact with bumper 2 as each stud assembly 42 is inserted through one of the holes 21. Such contact has a smaller coefficient of friction than rubber-to-metal contact of stud assemblies 12 and 28 of rub strips 1 and 25. This reduced friction during installation of stud assemblies 42 also reduces the possibility of clip 43 loosening its bond with pad 41.

Tapered portions 43a and 43b and legs 46 and 48 of clip 43 form some of the mold walls for the resilient portion 44 of stud assembly 42 during molding. Flash which is produced during molding on the outside surface of tapered clip portions 43a and 43b is automatically scraped from the clips 43 by the edges of hole 21 as triangular clip ends 45 are inserted through holes 21. Thus, any flash that may adhere to the exposed outer metal surface of mounting clip 43 does not need to be removed; and presents no problem in the installation of strip 40, such as is present in prior bumper strip constructions.

Outturned feet 50 provide a large area for holding the clips 43 in position and maintaining a solid bond with pad 41, and for resisting clips 43 from separation from pad 41 which would result in a faulty connection between strip assembly 40 and bumper 2.

IN GENERAL

FIGS. 17-20 illustrate related prior art in the vehicle bumper rub strip construction field. A prior construction is indicated generally at 51, and includes a rigid U-shaped metal channel 52 which is stamped to match the particular bumper contour of the vehicle on which rub strip 51 is to be mounted. A plurality of stud bolts 53 then are staked through the web of channel 52 at predetermined intervals.

These metal stamping and staking operations usually are performed at a factory site remote from the plant at which a resilient rubber pad 54 is molded and bonded to its internal reinforcing and stud mounting channel 52. The channels 52 must be shipped to the bonding and molding factory; which is expensive due to the weight and irregular shape of the channels, illustrated in FIGS. 17-20.

Each channel 52, together with a portion of the staked stud bolt shanks 55 must be cleaned and coated with an adhesive to secure a good bond with pad 54 prior to molding pad 54 with channel 52 therein. Substantially all of this adhesive must be applied manually, due to the irregular shape of channels 52 and the projection of bolts 53. Care also must be taken not to cover the end portion of bolt shank 55 with adhesive.

The adhesive-coated channel and bolt assembly then are molded to provide the rub strip 51. The molds required are expensive due to the irregular shape of channels 52 and bolts 53. A nearly perfect fit also must be achieved between the channel-bolt assembly and the mold cavity to prevent an extensive amount of flash from forming on the exposed threaded bolt shank 55. Removal of this flash from threaded shank 55 is extremely difficult and must be done manually. Likewise, removal of the usual flash from the corners of each molded pad 54 must be done largely by hand due to the irregular shape of pad 54 in conforming to the shape of channel 52, since such irregular shapes are not readily adapted for automatic trimming machine operations.

This irregular shape of the finally assembled rub strip 51 also increases the shipping cost from the molding plant to the point of installation on a vehicle bumper. Storage and handling of strip 51 also are problems due to this irregular shape.

Figure 18:
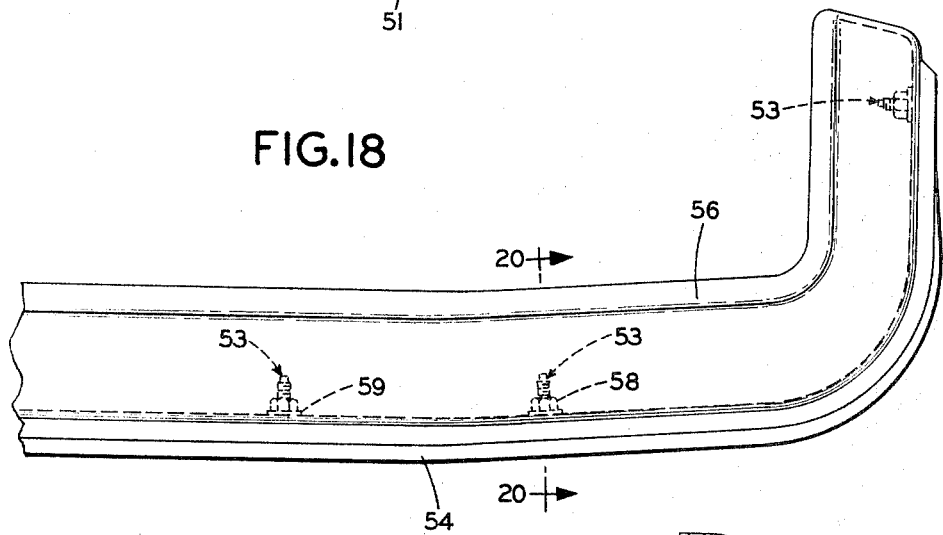
FIG. 18 is a fragmentary top plan view of the prior bumper rub strip construction of FIG. 17 shown mounted on a usual automobile bumper.
Figure 19:
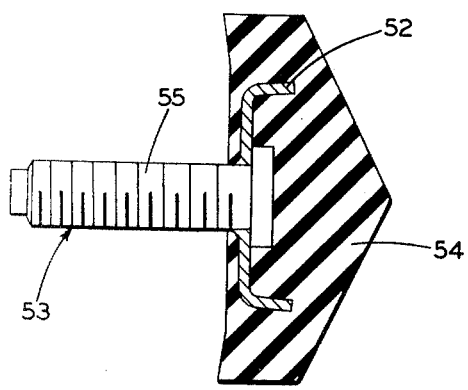
FIG. 19 is an enlarged sectional view taken on line 19—19, FIG. 17.
Figure 20:
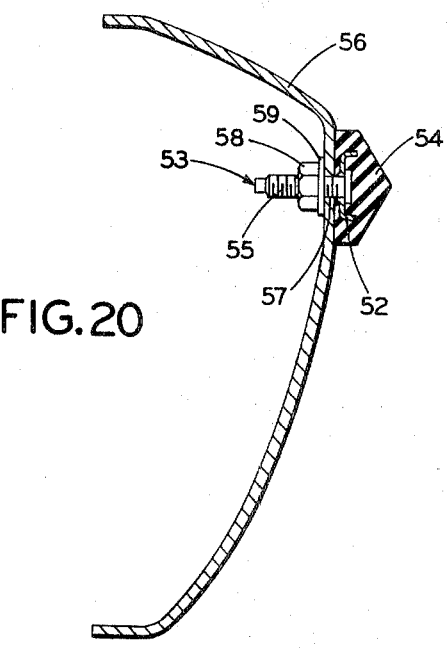
FIG. 20 is an enlarged sectional view taken on line 20—20, FIG. 18.

The means of mounting strip 51 on a vehicle bumper 56 is illustrated in FIGS. 18 and 20. Stud bolts 53 are inserted through preformed holes 57 in bumper 56 and a nut 58, together with a washer 59, are used to bolt strip 51 on bumper 56. It is difficult on many vehicles to gain access to the rear of a bumper with tools to install nut 58 tightly on shank 55. Also, the rigidity of channels 52 and of stake bolts 53 prevents even the slightest amount of compensation should bumper holes 57 and bolts 53 be misaligned.

Nut 58 and the exposed end of threaded shank 55 may rust and corrode after the vehicle is used for a short period of time, making the removal of strip 51 for replacement and repair extremely difficult. Such removal is especially difficult due to the location of nut 58 behind bumper 56.

Most of these problems are eliminated or reduced by the concept of the invention embodied in improved bumper rub strips 1, 25 and 40. The metal stamping and staking operation and the shipment of channels 52 and stake bolts 53 to a molding plant is completely eliminated. Thus, a considerable savings in labor and material costs is realized.

Rubber pads 3, 26 and 41 require no internal metal channels or similar longitudinally extending members to provide the mounting stud assemblies 12, 28 and 42 thereon. Metal studs 13 and clips 43 may be placed in large tumbling machines which automatically apply the bonding adhesive thereon, eliminating the heretofore required manual application. Studs 13 and clips 43 then may be placed automatically or manually at predetermined intervals in the mold cavities in which pads 3, 26 and 41 are molded. These molds are less expensive than the molds heretofore required for the formation of prior art pads 54. Pads 3, 26 and 41 may be molded in straight sections (FIGS. 1, 2, 9 and 10). The pads are shaped to conform to the vehicle bumper at the time of installation, and need not be formed to curved final shape when molded, as are pads 54 for strip 51 (FIGS. 17 and 18).

Flash may be trimmed in automatic operations from the edges of strips 3, 26 and 41 by trimming machines because of the straight configuration of the rub strip sections. Likewise, there are no threaded parts from which flash must be removed manually as with prior art strip constructions. Any flash which may be formed on the outer surfaces of tapered portions 46 of clip 43 presents no problem.

Completed rub strips 1, 25 and 40 may be shipped easily and inexpensively to vehicle installation locations since the strips are in straight sections and weigh less since channel 52 is eliminated.

Installation of the improved bumper rub strip is easier and quicker than prior bumper rub strips. Strips 1, 25 and 40 are contoured at time of installation to match the shape of bumper 2, and studs 13 and clips 43 align with bumper holes 21. The assembly force F used quickly and effectively, "snaps in" and seats shoulders 20, 35 and 49 against the inner surfaces of bumpers 2. The compression of flanges 8–9 and 36–37 maintains a continuous and sufficiently strong clamping force between bumpers 2 and the attached rub strips. Access need not be obtained to the rear of bumper 2 for installing a nut or other fastening device.

Should removal of rub strips 1, 25 and 40 ever be required, a pulling force in a direction opposite to that of force F will deform the resilient portions 14, 27 and 44 of their respective stud assemblies 12, 28 and 42 sufficiently to enable the stud assemblies to be removed from bumper holes 21. The stud assemblies may be damaged during such removal, requiring replacement of the bumper strip; but such replacement is involved in most situations that have required the removal of the strip.

Although stud members 13 and clip 43 are described as being formed of metal, these components may be formed of another nonmetallic rigid material, such as hard plastic, which has strength sufficient to resist deformation in an axial direction when force F is applied thereto and which will transmit force F to the resilient portion of the stud assembly resulting in the deformation thereof.

Thus, in accordance with the concept of the invention, the disclosed embodiments thereof provide a bumper rub strip construction having a resilient shock absorbing pad which is mounted on a vehicle bumper by a unique stud assembly. The stud assembly has an axially rigid portion embedded within and extending outwardly from the pad and a resilient portion bonded to the rigid portion. The resilient stud portion is deformed upon applying an axial force to the rigid stud portion as the stud assembly is inserted through a hole in the bumper. Shoulder formations on either the rigid or resilient portions of the stud assembly engage the bumper, and together with a force exerted by the partially compressed resilient stud portion securely mount the bumper rub strip assembly on a vehicle bumper.

Accordingly, considerable savings in material and labor costs is achieved in producing, shipping and installing the improved vehicle bumper rub strip construction, which construction achieves the stated objectives, eliminates difficulties which have characterized prior art rub strip constructions, and solves problems that exist in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved bumper rub strip construction is constructed, assembled and operates, the characteristics of the new construction, and the advantageous, new and useful results obtained; the new and useful structures, devices, elements, arrangements, parts, and combinations are set forth in the appended claims.

We claim:

1. Rub strip construction for mounting on a vehicle bumper including, an elongated pad of resilient material; the pad having front and rear surfaces, side edges, and a pair of flanges formed integrally with the pad adjacent said side edges; the flanges projecting laterally outwardly from the rear pad surface and being adapted to engage a bumper when the strip is mounted thereon; reinforcing ribs formed integrally with the resilient pad and extending at spaced intervals between the side edge flanges, and said ribs also extending transversely across the rear pad surface between said flanges; stud means formed on the pad and projecting from the rear pad surface; said stud means including a longitudinally rigid portion having head means embedded within the pad and projecting laterally outwardly from the rear pad surface, and a resilient portion formed integrally with the pad and bonded to the rigid portion; said resilient stud portion being deformed upon longitudinal insertion of the stud means through an opening in a vehicle bumper; and shoulder means formed on one of said rigid and resilient stud portions adapted to engage the rear surface of a vehicle bumper when said stud means is inserted through said bumper opening.

2. Rub strip construction for mounting on a vehicle bumper including, an elongated pad of resilient material having front and rear surfaces; stud means formed on the pad and projecting from the rear pad surface; said stud means including a longitudinally rigid portion having head means embedded within the pad and projecting laterally outwardly from the rear pad surface, and a resilient portion formed integrally with the pad and bonded to the rigid portion; the stud means rigid portion including a spring metal clip having spaced members; the stud means resilient portion being located between and molded with said spaced members and bonded thereto; the stud means resilient portion being deformed upon longitudinal insertion of the stud means through an opening in a vehicle bumper; and shoulder means formed on one of said rigid and resilient stud portions adapted to engage the rear surface of a vehicle bumper when said stud means is inserted through said bumper opening.

3. The construction defined in claim 2 in which the shoulder means is formed on the spaced metal clip members.

4. The construction defined in claim 2 in which the metal clip has inner and outer ends; in which the spaced clip members merge at the outer end in a generally triangular shape; and in which said spaced members terminate at the inner end in outturned feet-like head means which are embedded in the resilient pad.

5. Rub strip construction for mounting on a vehicle bumper including, an elongated pad of resilient material having front and rear surfaces; stud means formed on the pad and projecting from the rear pad surface; the stud means including a longitudinally rigid portion having head means embedded within the pad and projecting laterally outwardly from the rear pad surface, and a resilient portion formed integrally with the pad and bonded to the rigid portion; the stud means rigid portion including a spring metal clip having a pair of spaced legs, each leg terminating at one end in an outturned foot and the feet being molded within the resilient pad; the other ends of the clip legs terminating in inwardly tapered portions; the stud means resilient portion being deformed upon longitudinal insertion of the stud means through an opening in a vehicle bumper; shoulder means formed on the clip legs; the clip legs and tapered end portions being integrally joined; and said shoulder means being adapted to engage the rear surface of a vehicle bumper when said stud means is inserted through said bumper opening.

* * * * *